(12) United States Patent
Steiner et al.

(10) Patent No.: US 9,712,854 B2
(45) Date of Patent: Jul. 18, 2017

(54) COST-AWARE CLOUD-BASED CONTENT DELIVERY

(75) Inventors: Moritz M. Steiner, Montclair, NJ (US); Yao Liu, Fairfax, VA (US)

(73) Assignee: Alcatel Lucent, Boulogne-Billancourt (FR)

( * ) Notice: Subject to any disclaimer, the term of this patent is extended or adjusted under 35 U.S.C. 154(b) by 815 days.

(21) Appl. No.: 13/604,756

(22) Filed: Sep. 6, 2012

(65) Prior Publication Data

US 2014/0067898 A1 Mar. 6, 2014

(51) Int. Cl.
| | |
|---|---|
| G06F 15/16 | (2006.01) |
| H04N 21/2343 | (2011.01) |
| H04N 21/222 | (2011.01) |
| H04N 21/231 | (2011.01) |

(52) U.S. Cl.
CPC ..... *H04N 21/23439* (2013.01); *H04N 21/222* (2013.01); *H04N 21/231* (2013.01); *H04N 21/23103* (2013.01)

(58) Field of Classification Search
CPC ....... H04N 21/23439; H04N 21/23103; H04N 21/222; H04N 21/231
See application file for complete search history.

(56) References Cited

U.S. PATENT DOCUMENTS

| 5,617,347 A * | 4/1997 | Lauritzen ............ G06F 12/0884 365/189.07 |
|---|---|---|
| 7,475,106 B2 * | 1/2009 | Agnoli ..................... H04L 29/06 709/201 |
| 2001/0056416 A1 * | 12/2001 | Garcia-Luna-Aceves ............................. G06F 12/1483 |
| 2004/0098363 A1 * | 5/2004 | Anglin .............. G06F 17/30067 |
| 2004/0117427 A1 * | 6/2004 | Allen ............... H04N 21/21805 709/200 |
| 2006/0143668 A1 * | 6/2006 | Du Breuil .......... H04N 7/17318 725/89 |
| 2007/0179854 A1 * | 8/2007 | Ziv ........................ G06F 21/10 705/14.25 |
| 2007/0208737 A1 * | 9/2007 | Li ........................... H04L 67/26 |
| 2008/0039111 A1 * | 2/2008 | Ahuja ................. H04W 72/005 455/453 |
| 2008/0134039 A1 * | 6/2008 | Fischer ............. G06F 17/30053 715/733 |

(Continued)

OTHER PUBLICATIONS

Guo, et al., "The Stretched Exponential Distribution of Internet Media Access Patterns", PODC '08 Aug. 18-21, 2008, Toronto, Ontario Canada.*

*Primary Examiner* — Philip Chea
*Assistant Examiner* — Wuji Chen
(74) *Attorney, Agent, or Firm* — Tong, Rea, Bentley & Kim, LLC (57) ABSTRACT

A capability is provided for determining a fraction of content item versions to cache for use in responding to requests for content items. The fraction of content item versions to cache is determined based on a popularity distribution of the content item versions and cost model information associated with the content item versions. The cost model information may include information indicative of a cost of storing one of the content item versions and at least one of a cost of transcoding one of the content item versions or a cost of transferring one of the content item versions. The fraction of content item versions to cache may be determined based a skewness factor of the popularity distribution of the content item versions.

13 Claims, 5 Drawing Sheets

(56) References Cited

U.S. PATENT DOCUMENTS

| | | | |
|---|---|---|---|
| 2008/0320222 A1* | 12/2008 | Dhodapkar | G06F 12/121 711/118 |
| 2009/0083279 A1* | 3/2009 | Hasek | H04L 67/2823 |
| 2009/0320099 A1* | 12/2009 | Rao | H04L 9/3236 726/3 |
| 2012/0195362 A1* | 8/2012 | Benno | H04N 21/222 375/240.01 |
| 2013/0091582 A1* | 4/2013 | Chen | G06Q 10/10 726/26 |
| 2013/0103911 A1* | 4/2013 | Bulut | G06F 12/0866 711/144 |
| 2014/0207912 A1* | 7/2014 | Thibeault | H04L 67/2847 709/219 |

* cited by examiner

COST-AWARE CLOUD-BASED CONTENT DELIVERY

STATEMENT OF GOVERNMENT INTEREST

The present invention was made with Government assistance under National Science Foundation (NSF) Grant No. CNS-0831734. The Government has certain rights in this invention.

TECHNICAL FIELD

The disclosure relates generally to communication networks and, more specifically but not exclusively, to delivery of content via communication networks.

BACKGROUND

According to some predictions, video traffic is expected to account for a large percentage of all Internet traffic within a few years. This situation is exacerbated by the fact that most of the videos will need to be made available in a relatively large number of versions in order to account for the heterogeneous end user devices (e.g., end user devices supporting different screen sizes, codecs, or the like), different quality levels, different languages, or the like. The differing video version may require transcoding videos into a number of different versions, where such video transcoding is computationally expensive and, further, where the storage of the resulting transcoded versions requires significant storage capacity.

SUMMARY OF SOME EMBODIMENTS

Various deficiencies in the prior art are addressed by embodiments for determining a fraction of content item versions to cache.

In at least some embodiments, an apparatus includes a processor and a memory communicatively connected to the processor, where the processor is configured to determine a fraction of a plurality of content item versions to cache based on a popularity distribution of the content item versions and cost model information. The cost model information includes a cost of storing one of the content item versions. The cost model information also includes at least one of a cost of transcoding one of the content item versions or a cost of transferring one of the content item versions.

In at least some embodiments, a method includes determining, using a processor, a fraction of a plurality of content item versions to cache based on a popularity distribution of the content item versions and cost model information. The cost model information includes a cost of storing one of the content item versions. The cost model information also includes at least one of a cost of transcoding one of the content item versions or a cost of transferring one of the content item versions.

In at least some embodiments, a computer-readable storage medium stores instructions which, when executed by a computer, cause the computer to perform a method that includes determining a fraction of a plurality of content item versions to cache based on a popularity distribution of the content item versions and cost model information. The cost model information includes a cost of storing one of the content item versions. The cost model information also includes at least one of a cost of transcoding one of the content item versions or a cost of transferring one of the content item versions.

In at least some embodiments, an apparatus includes a processor and a memory communicatively connected to the processor, where the processor is configured to receive a request for a content item at a first data storage location and determine, based on a cost of transmitting the content item from the first data storage location to a second data storage location and a cost of transcoding the content item at the second data storage location, whether to transcode the content item at the first data storage location or the second data storage location.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, a cost-aware content delivery capability is provided. In at least some embodiments, the cost-aware content delivery capability is configured to leverage the elasticity of cloud computing to deal with increasing demand for content. In at least some embodiments, the cost-aware content delivery capability is configured to determine a fraction of available content item versions to store for use in responding to requests for content items. The available content item versions may include, for each of a plurality of available content items, a master version of the content item or one or more transcoded versions of content item. The content item versions may be cached in one or more of a cloud-based data center, an Internet Service Provider (ISP) data center, or the like, as well as various combinations thereof.

Figure 1:
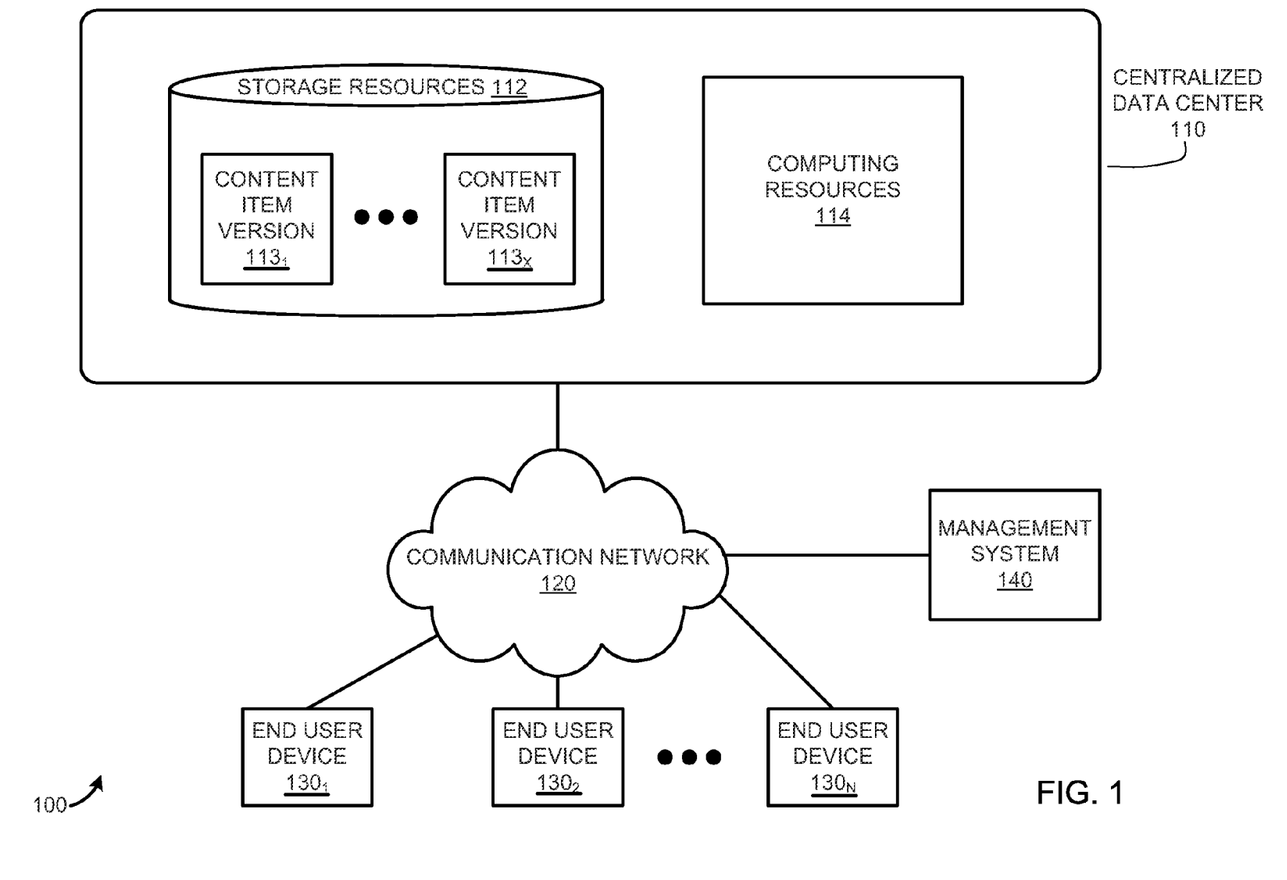
FIG. 1 depicts a high-level block diagram of a communication system including a centralized data center configured to deliver content items to end user devices.

FIG. 1 depicts a high-level block diagram of a communication system including a centralized data center configured to deliver content items to end user devices.

The communication system 100 includes a centralized data center 110, a communication network 120, a plurality of end user devices $130_1$-$130_N$ (collectively, end user devices 130), and a management system 140.

The communication system 100 provides for delivery of content items from centralized data center 110 to end user devices 130 via communication network 120. The content items may include any type(s) of content items (e.g., videos or other content) that may need to be transcoded before being delivered to ones of the end user devices 130. In general, for a content item, the content item may be delivered to end user devices 130 as a content item version (i.e., a version of the content item). It will be appreciated that for each content item, one or more content item versions will be available for use in delivering the content item to end user devices 130. The content item versions may include one or more master versions of the content item. The content item versions may include one or more transcoded versions of the content item, where a transcoded version of the content item may be generated from a master version of the content item or from another transcoded version of the content item. For example, the content item versions of a content item may differ in terms of one or more of quality level, language, format, or the like, as well as various combinations thereof. For example, the transcoding of a first content item version to provide a second content item version may be performed to accommodate one or more of differences among end user devices 130 (e.g., differences in screen sizes of end user devices 130, differences in codecs used by end user devices 130, or the like), differences in the end users using the end user devices 130 to consume the content item (e.g., differences in quality level of the content as requested by end users of end user devices 130, different languages requested by end users of end user devices 130, or the like), or the like, as well as various combinations thereof. For example, a 1080p version of a movie (e.g., the master version) may be transcoded to generate a 720p version of the movie or a 480p version of the movie. For example, a version of a video which may be played on a first type of computing device may be transcoded to generate a version of the video that may be played on a second type of computing device. For example, for a given content item, a television version of the content item may be provided at 1080p quality, a tablet version of the content item may be provided at 720p quality, and a smart phone version of the content item may be provided at 480p quality. In this manner, one or more content item versions may be made available for each content item and, in at least some cases, transcoding of one or more versions of a content item may result in a relatively large number of available content item versions for that content item. It is noted that the typical types of content item versions which may be supported, as well as the typical conditions under which such content item versions may be provided, will be understood by one skilled in the art.

The centralized data center 110 may be any suitable type of data center (e.g., a centralized cloud-based data center, a centralized Internet Service Provider (ISP) data center, a centralized public data center, or any other suitable type of centralized data center). The centralized data center 110 includes resources for supporting delivery of content items to end user device 130 via communication network 120.

The centralized data center 110 includes storage resources 112 and computing resources 114.

The storage resources 112 are configured to cache content item versions 113 within centralized data center 110 (illustratively, content item versions $113_1$-$113_X$). The content item versions 113 may include all or a subset of the total set of available content item versions associated with the set of content items available to the centralized data center 110. In other words, the content item versions 113 may include, for each content item available to the centralized data center 110, zero or more content item versions (e.g., no content item versions for a relatively unpopular content item or multiple content item versions for a relatively popular content item). The transcoded content item versions 113 may be generated in advance of requests for the content items or on demand when requests for the content items are received. The storage resources 112 may be used to cache transcoded content item versions 113 generated by computing resources 114 via transcoding and, thus, may save at least some transcoding cost (e.g., by storing a transcoded content item version 113 of a content item such that the transcoded content item version 113 may be sourced from storage resources 112, in response to requests for the transcoded content item version 113 of the content item, without having to be transcoded in response to each request for the transcoded content item version 113 of a content item) at the expense of additional storage cost. The storage resources 112 are elastic and, thus, may be increased or decreased on demand. The storage resources 112 also have a cost associated therewith (i.e., increasing the amount of storage resources 112 increases the cost that needs to be paid and, similarly, decreasing the amount of storage resources 112 decreases the cost that needs to be paid). The manner in which the quantity of storage resources 112 is dynamically changed within a data center environment will be understood by one skilled in the art.

The computing resources 114 are configured to perform various functions within centralized data center 110. The computing resources 114 may be configured to handle requests for content items received from end user devices 130. The computing resources 114 may be configured to receive a request for a content item from an end user device 130, obtain the correct content item version 113 of the requested content item, and propagate the correct content item version 113 of the requested content item toward the end user device 130. For example, computing resources 114 may be configured to obtain the correct content item version 113 of the requested content item by retrieving the correct content item version 113 of the requested content item from storage resources 112 when the correct content item version 113 of the requested content item is available from storage resources 112 (e.g., where the transcoded content item version 113 of the content item was previously generated and stored in storage resources 112). For example, computing resources 114 may be configured to obtain the correct content item version 113 of the requested content item by transcoding a content item version 113 of the requested content item to form a transcoded content item version 113 of the requested content item when the correct content item version 113 of the requested content item is not available from storage resources 112 (and also may be configured to store the transcoded content item version 113 of the content item in storage resources 112). In other words, the computing resources 114 may be configured to transcode content items in advance of requests for the content items or to transcode content items on demand when requests for the content items are received. The computing resources 114 are elastic and, thus, may be increased or decreased on demand. The computing resources 114 also have a cost associated therewith. The manner in which the quantity of computing resources 114 is dynamically changed within a data center environment will be understood by one skilled in the art.

The communication network 120 may include any suitable type of communication network which may support communication between the centralized data center 110 and the end user devices 130. For example, the communication network 120 may include one or more of a wireless network (e.g., Radio Access Network (RAN) and associated core network providing access to the Internet), a public packet-based communication network, a private packet-based communication network, or the like, as well as various combinations thereof.

The end user devices 130 include any end user devices via which users may request and consume content items available from centralized data center 110. For example, the end user devices 130 may include desktop computers, laptop computers, tablets, smartphones, set top boxes, video player devices, gaming consoles, televisions, or the like.

The management system 140 is configured to perform functions of the cost-aware content delivery capability.

The management system 140 is configured to determine, given a set of content item versions 113 (including, for each content item, the master version of the content item or one or more transcoded versions of the content item), a fraction of the content item versions 113 to store in the storage resources 112 of the centralized data center 110 (denoted herein as eta), such that the stored content item versions 113 are available for use in responding to requests for the associated content items. For illustrative purposes, there are N content item versions 113, the sizes of the content item versions 113 are uniform, and the storage resources 112 can store [eta×N] content items where 0≤eta≤1. It will be appreciated that the sizes of the content item versions 113 may vary. It is noted that the fraction of the content item versions 113 to store in the centralized data center 110 also is indicative of the fraction of the content item versions 113 to transcode on demand when the content items are requested by end user devices 130 (i.e., since any content item version 113 that is not stored in the storage resources 112 of the centralized data center 110 when a request for the content item is received at the centralized data center 110 will need to be transcoded on demand).

The management system 140 may determine the fraction of the content item versions to store in centralized data center 110 based on cost model information associated with the centralized data center 110 and a popularity distribution of the content item versions 113.

The cost model information specifies costs associated with various aspects of supporting delivery of content item versions 113 from centralized data center 110 to end user devices 130. The cost model information may be specified by the provider of centralized data center 110. The cost model information may include prices such as cost per time period of storage (e.g., $0.01 per GB/month storage, $0.02 per GB/month, or the like), cost per period of time per content item (e.g., $0.003 per month per content item, $0.005 per month per content item, or the like), cost per period of time per instance (e.g., $0.17 per hour per instance, $0.20 per hour per instance, or the like), cost per transcoding (e.g., $0.009 per transcoding operation, $0.012 per transcoding operation, or the like), or the like, as well as various combinations thereof. The cost model information may specify the cost to store a single content item version 113 using storage resources 112 (denoted as $C_{storage}$) and the cost to generate a single content item version 113 via transcoding using computing resources 114 (denoted as $C_{transcode}$). It is noted that, for communication system 100, the transmission cost of transmitting content item versions 113 from the centralized data center 110 to ones of the end user devices 130 is assumed to be constant and, thus, the transmission cost is not considered in the cost-based analysis for determining caching of content item versions 113 using storage resources 112 of centralized data center 110 (although it is noted that, in at least some embodiments, transmission costs may be considered). In at least some embodiments, one or more of the costs may be based on block size of data blocks including portions of content item versions 113 (e.g., based on a block size of 4 KB, 8 KB, or the like).

The determination of the fraction of content item versions 113 to store in centralized data center 110 may be better understood by first considering cost characteristics of a single content item version 113. There will be a single storage cost for storing the content item version 113 in centralized data center 110 ($C_{storage}$), and there will be a transcoding cost that is incurred each time the content item version 113 is generated via transcoding using computing resources 114 ($C_{transcode}$). If the content item version 113 is requested n times, then the total transcoding cost for the content item version 113 is ($n*C_{transcode}$). In other words, if the content item version 113 is requested a relatively large number of times then the total transcoding cost of the content item version 113 will be relatively high, whereas if the content item version 113 is requested a relatively small number of times then the total transcoding cost of the content item version 113 will be relatively small. Thus, if the total transcoding cost is greater than the storage cost of storing the content item version 113 in centralized data center 110 (i.e., $(n*C_{transcode}) > C_{storage}$) then the content item version 113 should be stored in centralized data center 110; otherwise, the content item version 113 should be transcoded on demand when requested (e.g., it is not worth it to store the content item version 113 in centralized data center 110). It is noted that the foregoing discussion illustrates the manner in which a tradeoff between transcoding cost and storage cost may be used to lower operating costs for cloud-based content delivery providers.

The determination of the fraction of content item versions 113 to store in centralized data center 110 may be based on application of the above-described cost analysis, related to tradeoff between transcoding and storage of a single content item version 113, to the set of content item versions 113 available for storage in centralized data center 110. The computation of the fraction of content item versions 113 to store in centralized data center 110 is based on a popularity distribution of the content item versions 113. The popularity distribution of the content item versions 113 provides an indication as to the number of times the content item versions 113 are expected to be requested in the future. In at least some embodiments, based on the above-described cost analysis related to tradeoff between transcoding and storage of a single content item version 113, the fraction of content item versions 113 to store in centralized data center 110 is the fraction of content item versions expected to be requested more than n times (e.g., the fraction of content item versions satisfying $(n*C_{transcode}) > C_{storage}$)).

The popularity distribution of the content item versions 113 may conform to any suitable distribution model (e.g., Zipfian or the like). The popularity distribution of the content item versions 113 may be based on one or more of predicted popularity, measured popularity, or the like. The popularity distribution of the content item versions 113 may be determined based on assumptions regarding modeling of requests for content item versions 113, by building the distribution over time (e.g., by monitoring and counting requests by end user devices 130 for content item versions 113 available from centralized data center 110), or the like, as well a various combinations thereof. The popularity distribution of the content item versions 113 may have a skewness factor (denoted herein as α) associated therewith, where the skewness factor is associated with the popularity distribution of the content item versions accessed at the associated data center. The distribution model specified by the popularity distribution of the content item versions 113 may dictate the equation that is used to determine the fraction of content item versions 113 to store in centralized data center 110. In general, it is expected that the equation that is used to determine the fraction of the content item versions 113 to store in storage resources 112 of centralized data center 110 may be used to identify the estimated optimal value of which fraction of the content item versions 113 to store using storage resources 112 of centralized data center 110 and which fraction of the content item versions 113 to transcode on demand using computing resources 114 of centralized data center 110 while reducing (and, in at least some cases minimizing) the total cost (e.g., a summation of the storage costs for storing content item versions 113 and the computing costs for retranscoding content item versions 113) of delivering content item versions 113 to end user devices 130.

The management system 140 may be configured to compute the fraction of the content item versions 113 to store in centralized data center 110 based on the cost of storing a content item version 113 in the storage resources 112 of centralized data center 110 ($C_{storage}$), a cost of transcoding a content item to form a content item version 113 using computing resources 114 of centralized data center 110 ($C_{transcode}$), and at least one characteristic of the popularity distribution of the content item versions 113. In this manner, where the distribution of the available content item versions 113 is based on popularity, a determination may be made that a certain fraction of the more popular content item versions 113 is to be cached using storage resources 112 (such that more popular content item versions 113 may simply be retrieved and provided in response to requests for the content items) and a certain fraction of the less popular content item versions 113 is to be transcoded on demand using computing resources 114 (since it is not cost-effective to store less popular content items which can be transcoded in response to requests for the content items). In this manner, management system 140 is configured to determine how many content item versions 113 to store using storage resources 112 and how many content item versions 113 to transcode on demand using computing resources 114, as well as which of the content item versions 113 to store and which of the content item versions 113 to transcode on demand.

The fraction of content item versions 113 to store in centralized data center 110 may be determined based on a cost equation for an average total cost (storage cost plus transcoding cost) per content item version 113. The cost equation includes variables of the storage cost of a content item version 113 ($C_{storage}$), the transcoding cost of a content item version ($C_{transcode}$), the fraction of content item versions 113 to store in centralized data center 110 (eta), and a skewness factor ($\alpha$) of the popularity distribution of the content item versions 113. The cost equation that is used may be based on the distribution model of the popularity distribution of the content item versions 113 (e.g., different cost equations associated with different distribution models may be used depending on the distribution model with which the popularity distribution of the content item versions 113 is associated).

Figure 2:
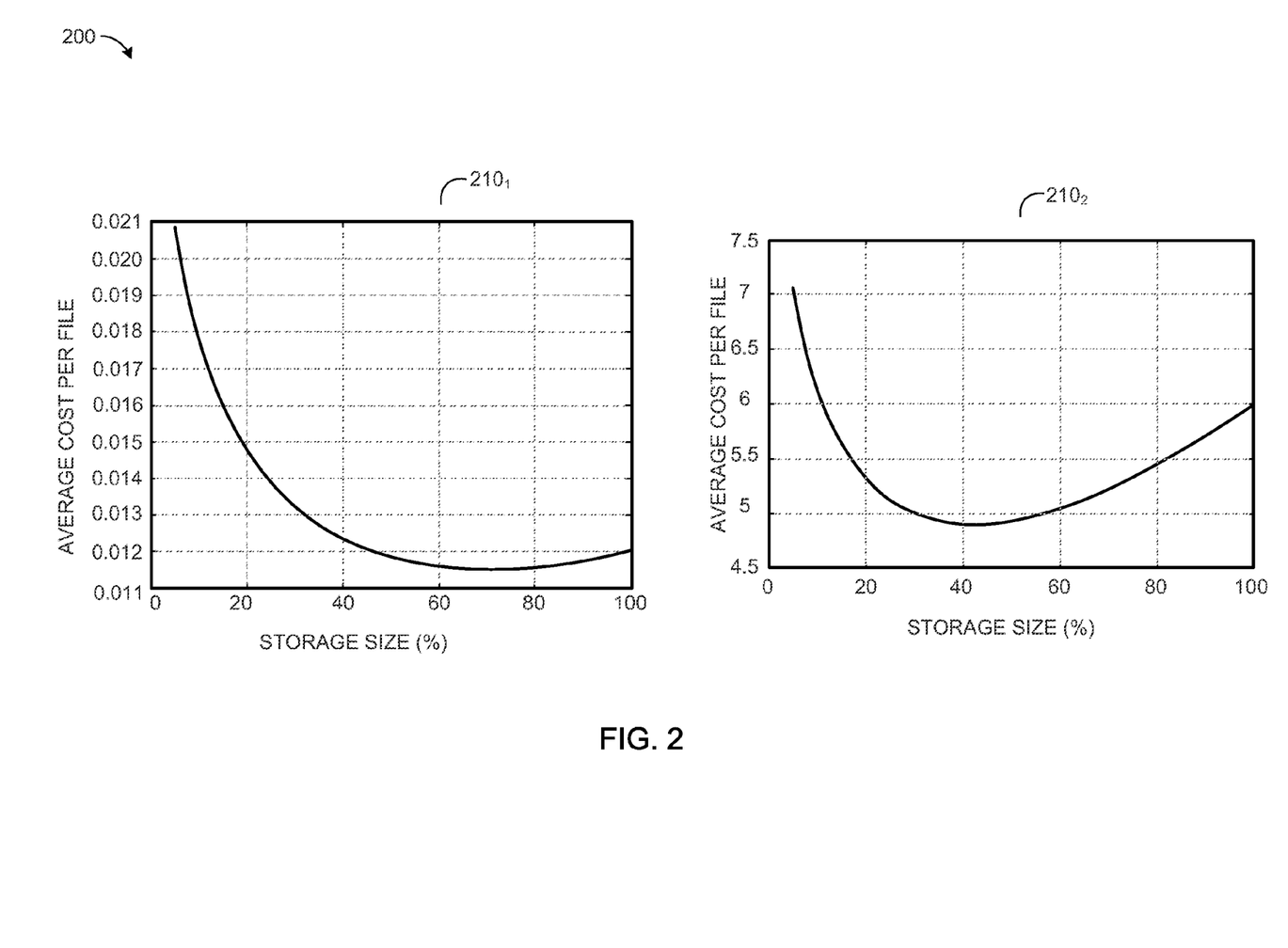
FIG. 2 depicts exemplary graphs plotting a fraction of content item versions to store against an average cost per content item version.

In at least some embodiments, the fraction of content item versions 113 to store in centralized data center 110 may be determined based on the cost equation for the average total cost per content item version by (1) computing, for each of a plurality of potential fraction values, an average total cost associated with storing that fraction of content item versions 113 in centralized data center 110, and (2) selecting the potential fraction value having the lowest associated cost value as the fraction of content item versions 113 to store in centralized data center 110. As noted above, the cost is computed a plurality of times for a plurality of different values of the fraction of content item versions 113 to store in centralized data center 110 such that multiple pairs of cost values and associated fraction values are determined and, thus, may be represented as a graph in which the cost is plotted against the fraction of content item versions 113 to store in centralized data center 110. The graph provides a visualization of a point that represents the fraction of content item versions 113 to store in centralized data center 110 in order to achieve the lowest associated cost (e.g., the lowest point in the graph where the fraction values are plotted on the x-axis and the cost values are plotted on the y-axis). An exemplary graph-based representation of pairs of cost values and fraction values is depicted in FIG. 2. This embodiment may be better understood by considering a specific type of popularity distribution of the content item versions (e.g., a Zipf distribution).

In at least some embodiments, the fraction of content item versions 113 to store in centralized data center 110 may be determined based on the cost equation for the average total cost per content item version 113 by adapting the cost equation to obtain an equation which may be evaluated to determine the fraction of content item versions 113 to store in centralized data center 110 (e.g., for modifying the cost equation to obtain an equation for eta which, when solved, provides a value of eta (e.g., a value of the fraction of content item versions 113 to store in centralized data center 110). The adaptation of the cost equation to obtain an equation which may be evaluated to determine the fraction of content item versions 113 to store in centralized data center 110 may be performed by taking a derivative of the cost equation over the variable eta and then further adapting the result of the derivative in a manner for producing an equation which may be evaluated to determine the fraction of content item versions 113 to store in centralized data center 110. The resulting equation for eta may includes variables of the storage cost of a content item version 113 ($C_{storage}$), the transcoding cost of a content item version ($C_{transcode}$), and a skewness factor ($\alpha$) of the popularity distribution of the content item versions 113. This embodiment may be better understood by considering a specific type of popularity distribution of the content item versions (e.g., a Zipf distribution).

In at least some embodiments, as noted above, the popularity distribution of the content item versions 113 may follow a Zipfian (Zipf) distribution. In this embodiment, the cost equation may be specified as $((1/(1-\alpha)-(eta^{(1-\alpha)}/(1-\alpha)-eta))\times C_{transcode}+(eta \times C_{storage})$, where $C_{storage}$ is the cost of storing a content item version 113, $C_{transcode}$ is the cost of transcoding a content item version 113, eta is the fraction of content item versions 113 to store in centralized data center 110, and $\alpha$ is the skewness factor of the popularity distribution of the content item versions 113. This cost equation may be adapted to obtain an equation which may be evaluated to determine the fraction of content item versions 113 to store in centralized data center 110. Taking the derivative of the cost equation over eta results in the intermediate equation $(1-(eta^{-\alpha}))\times C_{transcode}+C_{storage}$. Thus, the estimated optimal value for the fraction of content item versions 113 to store in centralized data center 110 is where $(1-(eta^{-\alpha}))\times C_{transcode}+C_{storage}=0$ (e.g., this equation represents the estimated optimal value of which fraction of content item versions 113 to store using storage resources 112 of centralized data center 110 while minimizing the cost). The estimated optimal value of eta is associated with the lowest point of a graph in which the fraction of content item versions 113 to store in the centralized data center 110 is plotted against the average total cost per content item version 113. The intermediate equation $[(1-(eta^{-\alpha}))\times C_{transcode}+C_{storage}=0]$ may then be solved for eta, resulting in a final equation of eta=$10^{\wedge}((\log_{10}(C_{transcode}/(C_{transcode}+$ $C_{storage}$)))/α). As noted above, the cost equation that is used to determine the fraction of the content item versions 113 to store in centralized data center 110 (and, thus, the final equation for eta) may be different where the popularity distribution of the content item versions 113 follows a different distribution model (i.e., for distributions other than Zipf).

FIG. 2 depicts exemplary graphs plotting a fraction of content item versions to store against an average cost per content item version.

As depicted in FIG. 2, the graphs 210 include a first graph $210_1$ and a second graph $210_2$. The graphs 210 are each based on a Zipf popularity distribution of content item versions and each plot the fraction of content item versions to store on the x-axis and the average cost per content item version on the y-axis.

The first graph $210_1$ is based on costs of $0.01 per GB/month storage, $0.003 per month per content item version, $0.17 per hour per instance, and $0.009 per transcoding. In first graph $210_1$, the fraction of content item versions associated with the lowest average cost per content item version is approximately 0.70.

The second graph $210_2$ is based on costs of $0.01 per GB/month storage, $0.003 per month per content item version, $0.06 per hour per instance, and $0.003 per transcoding. In second graph $210_2$, the fraction of content item versions associated with the lowest average cost per content item version is approximately 0.41.

Returning now to FIG. 1, it is noted that the total storage cost for the content item versions 113, the total transcoding cost for the content item versions 113, and the total operating cost for supporting the content item versions 113 may be determined. For illustrative purposes, there are N content item versions 113, the sizes of the content item versions 113 are uniform, and the storage resources 112 can store [eta×N] content items where 0≤eta≤1. It will be appreciated that the sizes of the content item versions 113 may vary. The total storage cost of storing the fraction of content item versions 113 may be specified as [eta×N×$C_{storage}$]. The total transcoding cost may be specified as [storage_cache_miss× $C_{transcode}$], which may be rewritten as [(total_access−storage_cache_hits)×$C_{transcode}$], where total_access=N/(1−α), and where α is the skewness factor of the popularity distribution of content item versions 113. The total running cost of supporting requests for the content item versions 113 may be determined as N×[cost equation], where [cost equation] represents the average total cost for each of the content item versions (e.g., $((1/(1-\alpha)-(eta^{(1-\alpha)}/(1-\alpha)-eta))\times C_{transcode}+(eta\times C_{storage}))$ in the case of a Zipf distribution of the content item versions 113).

The management system 140 may be configured to determine the fraction of the content item versions 113 to store in centralized data center 110 periodically or based on one or more conditions. The conditions may include a change to one or more of the input parameters used to determine the fraction of the content item versions 113 to store in centralized data center 110. For example, management system 140 may be configured to determine the fraction of the content item versions 113 to store in centralized data center 110 in response to a change in the cost model (e.g., where the provider of the centralized data center 110 changes a storage price associated with storage resource 112 or a computing price associated with computing resources 114), in response to a change in the distribution of the content item versions 113, or the like, as well as various combinations thereof. The management system 140 may receive indications of such changes in any suitable manner.

The management system 140 is configured to initiate one or more actions to support configuration of the centralized data center 110 to support the fraction of the content item versions to store in centralized data center 110. Initiated actions may include sending an indication of the fraction to the centralized data center 110 for use by the centralized data center 110 to provision an appropriate amount of storage resources 112 for caching of content item versions 113, sending an indication of the fraction to one or more management systems configured to automatically initiate provisioning of an appropriate amount of storage resources 112 for caching of content item versions 113, reporting the fraction to one or more administrators which may initiate provisioning of an appropriate amount of storage resources 112 for caching of content item versions 113, or the like. Initiated actions, depending on the previously determined fraction, also may include initiating a request to decrease the amount of storage resources 112 available in the centralized data center 110 for caching content item versions 113, initiating a request to increase the amount of storage resources 112 available in the centralized data center 110 for caching content item versions 113, or the like.

The management system 140 determines the fraction of the content item versions 113 to store in centralized data center 110, which indicates that not all of the available content item versions 113 can be cached using storage resources 112. Thus, the centralized data center 110 may be configured to use one or more cache replacement schemes to decide which of the available content item versions 113 to cache using storage resources 112 (and then to control addition of content item versions 113 to storage resources 112 and removal of content item versions 113 from storage resources 112 based on such determinations). For example, centralized data center 110 may use one or more of a Least Recently Used (LRU) cache replacement scheme, a Least Frequently Used (LFU) cache replacement scheme, or the like. The fraction of content item versions 113 to cache using storage resources 112 may be used as an input to the cache replacement scheme(s) used to control the content item versions 113 that are actually cached using storage resources 112. The use of the cache replacement scheme(s) enables caching of any suitable combination of content item versions 113.

The communication system 100 may be configured to use the various resources of centralized data center 110 to handle requests for content items received from the end user devices 130. The handling of a request for a content item begins when an end user device 130 sends a request for a content item to the centralized data center 110. The centralized data center 110 receives the request for the content item and determines which content item version of the content item 113 is to be provided to the end user device 130. The identification of the content item version 113 may be specified in the request for the content item or may be determined by centralized data center 110. The centralized data center 110 determines whether the content item version 113 is cached locally in the storage resources 122 of the centralized data center 110. If the content item version 113 is cached locally in the storage resources 112 of the centralized data center 110, the centralized data center 110 retrieves the content item version 113 from the storage resources 112 and propagates the content item version 113 toward the end user device 130. If the content item version 113 is not cached locally in the storage resources 112 of the centralized data center 110, but the master version of the requested content item is available to the centralized data center 110, the centralized data center 110 transcodes the master version of the requested content item locally using the computing resources 112 of the centralized data center 110 to form the content item version 113 and propagates the content item version 113 toward the end user device 130. As described above, the decision as to whether or not the content item version 113 of the requested content item is available at the centralized data center 130 when the request for the content item is received may be based on the fraction of content item versions 113 which are stored using the storage resources 112 of centralized data center 110 and one or more parameters (e.g., popularity or the like) of the content item version 113 relative to other content item versions 113 which are available and considered for storage using the storage resources 112 of centralized data center 110.

Figure 3:
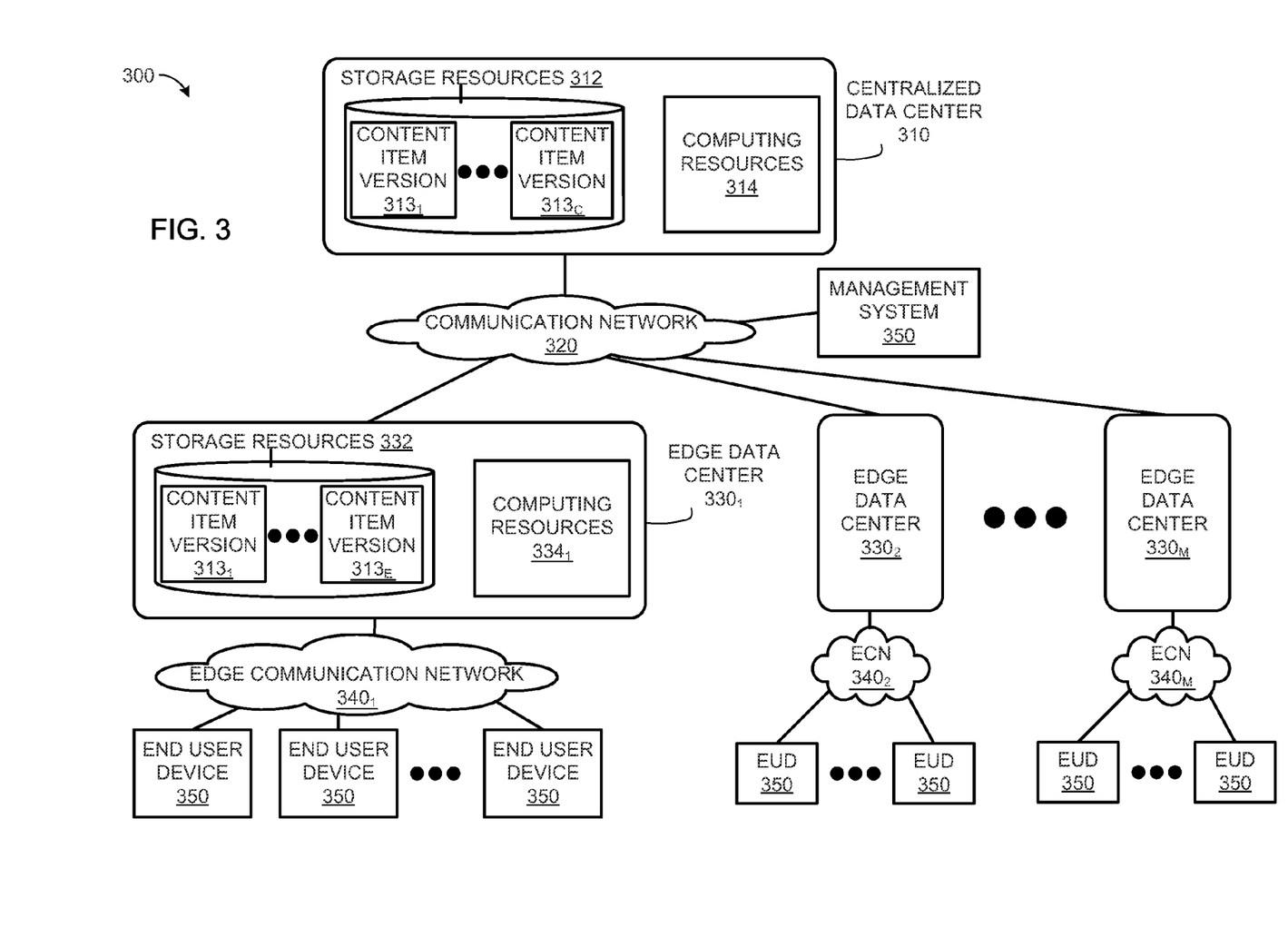
FIG. 3 depicts a high-level block diagram of a communication system including a distributed data center configured to deliver content items to end user devices.

FIG. 3 depicts a high-level block diagram of a communication system including a distributed data center configured to deliver content items to end user devices.

The communication system 300 of FIG. 3 is similar, in some respects, to the communication system 100 of FIG. 1, although there is an additional layer of edge data centers and associated edge communication networks disposed between the centralized data center 110 and the end user devices 130.

The communication system 300 includes a centralized data center 310, a communication network 320, a plurality of edge data centers $330_1$-$330_M$ (collectively, edge data centers 330), a plurality of edge communication networks $340_1$-$340_M$ (collectively, edge communication networks 340), a plurality of end user devices $350_1$-$350_N$ (collectively, end user devices 350), and a management system 360. The centralized data center 310 and edge data centers 330 are configured to communicate via communication network 320. The edge data centers 330 and end user devices 350 are configured to communicate via the edge communication networks 340, respectively.

The communication system 300 provides for delivery of content items from centralized data center 310 to end user devices 350 via communication network 320, edge data centers 330, and edge communication networks 340. The communication system 300 also provides for delivery of content items from the edge data centers 330 to sets of end user devices 350 associated with the edge data centers 330, respectively. As described with respect to FIG. 1, the content items may be maintained as content item versions 313 which may include, for each content item, a master version of the content item and one or more transcoded versions of the content item. It is noted that a content item version may be maintained at centralized data center 310 or one or more of the edge data centers 330.

The centralized data center 310 may be configured in a manner similar to centralized data center 110 of FIG. 1. Namely, the centralized data center 310 includes storage resources 312 and computing resources 314, which are configured in a manner similar to the storage resources 112 and the computing resources 114 of the centralized data center 110 of FIG. 1, respectively. The storage resources 312 store a plurality of content item versions $313_1$-$313_C$. The centralized data center 310 is configured to serve requests for content items received from end user devices 350 (similar to centralized data center 110 of FIG. 1), as well as to serve requests for content items received from edge data centers 330 (e.g., when an edge data center 330 forwards a request for a content item that is received at the edge data center 330 but cannot be served by the edge data center 330, when an edge data center requests a content item version 313 to be cached in the edge data center 330, or the like).

The communication network 320 may be configured in a manner similar to the communication network 120 of FIG. 1. However, it will be appreciated that the communication network 320 of FIG. 3 may not support communication to the end user devices 350; rather, communication with the end user devices 350 is depicted as being via edge data centers 330 and edge communication networks 340. The communication network 320 may be any type of communication network configured to support communications between data centers (e.g., a public packet-based communication network, a private packet-based communication network, or the like).

The edge data centers 330 each may be configured in a manner similar to centralized data center 320 of FIG. 3 (and, thus, centralized data center 110 of FIG. 1), although it will be appreciated that, in general, the edge data centers 330 are expected to support (1) cheaper bandwidth to end user devices 350 than centralized data center 310 and (2) less resources than centralized data center 310. As depicted in FIG. 3, the edge data centers 330 include storage resources $332_1$-$332_M$ (collectively, storage resources 332) and computing resources $332_1$-$332_M$ (collectively, storage resources 332), respectively. The storage resources 332 and computing resources 334 of each of the edge data centers 330 may be configured to operate in a manner similar to the storage resources 312 and computing resources 314 of centralized data center 310 (and, thus, in a manner similar to the storage resources 112 and computing resources 114 of centralized data center 110). In other words, it will be appreciated that each edge data center 330 may be configured to function in a manner similar to that of a centralized data center for the set of end user devices 350 associated with the edge data center 330. For each of the edge data centers 330, the storage resources 332 of the edge data center 330 store a plurality of content item versions 313. It is noted that each of the edge data centers 330 is expected to store less content item versions 313 than the centralized data center 310. It is further noted that edge data centers 330 each may store a subset of content item versions 313 stored in centralized data center 310, one or more content item versions 313 not stored in centralized data center 310, or the like, as well as various combinations thereof. The edge data centers 330 each are configured to serve requests for content items received from their associated sets of end user devices 350, respectively. It is assumed that the edge data centers 330 are not configured to communicate with each other (although such communication may be possible).

The edge communication networks 340 are configured to support communication between the edge data centers 330 and the sets of end user devices 350 associated with the edge data centers 330, respectively. For example, the edge communication networks 340 may include Radio Access Networks (RANs), cable networks, Digital Subscriber Line (DSL) networks, or the like, as well as various combinations thereof.

The end user devices 350 include any end user devices via which users may request and consume content item versions 313 available from centralized data center 310 and edge data centers 330. For example, the end user devices 350 may include desktop computers, laptop computers, tablets, smartphones, set top boxes, video player devices, gaming consoles, televisions, or the like.

The management system 360 is configured to perform functions of the cost-aware content delivery capability.

The management system 360 may be configured to determine the fraction of the content item versions 313 to store in a data center based on cost model information (associated with the data center for which the fraction is determined and, optionally, one or more additional data centers) and a popularity distribution of the content item versions 313.

The cost model information may be associated with the centralized data center 310 or more one more of the edge data centers 330). As described above, the communication system 300 includes various resources in both centralized data center 310 and each of the edge data centers 330. There are storage costs and computing costs associated with storage resources 312 and computing resources 314 of centralized data center 310 and, similarly, there are storage costs and computing costs associated with storage resources 332 and computing resources 334 of each of the edge data centers 330. In general, the storage costs and computing costs at centralized data center 310 are expected to be greater than the storage costs and computing costs at each of the edge data centers 330, respectively; however, providing content item versions 313 to the end user devices 350 from centralized data center 310 is expected to have a greater bandwidth cost than providing content item versions 313 to the end user devices 350 from edge data centers 330 (due to the additional bandwidth required to transmit content item versions from the centralized data center 310 to the edge data centers 330. The storage costs and computing costs of the edge data centers 330 may vary across the edge data centers 330 (although, in some cases, average storage or computing costs of the edge data centers 330 may be used). The typical storage costs and computing costs of storage resources and computing resources at a centralized data center will be understood by one skilled in the art and, similarly, the typical storage costs of storage resources and computing costs at an edge data center will be understood by one skilled in the art.

The popularity distribution of the content item versions 313 may be understood by way of reference to discussions of the popularity distribution of the content item versions 113 of FIG. 1.

The management system 360 may be configured to determine the fraction of the content item versions 313 to store in a data center based on cost-based analysis related to the distributed environment of FIG. 3 in which there may be interaction between centralized data center 310 and the edge data centers 330.

In at least some embodiments, management system 360 is configured to determine the fraction of the content item versions 313 to store in centralized data center 310 based on (1) a popularity distribution of the content item versions 313 and (2) cost model information associated with the centralized data center 310 and the edge data centers 330 (namely a cost of storing one of the content item versions 313 at the centralized data center 310 (denoted as $C_{storage}$) and a cost of transcoding the content item version 313 at one of the edge data centers 330 (denoted as $E_{transcode}$)). The analysis for the present embodiment is similar to the analysis used for the centralized case of FIG. 1. In the present embodiment, storage resources 312 at the centralized data center 310 are used to store content item versions 313 to the amount that the storage cost at the centralized data center 310 is less than the potential transcoding cost at the edge data centers 330 (i.e., as long as $n \times E_{transcode} > C_{storage}$, where n is the total number of times that the content item version 313 is requested across all of the edge data centers 330 combined). In the present embodiment, the fraction of content item versions 313 to cache in the centralized data center 310 may be determined based on a cost of storing a content item version 313 in centralized data center 310, a cost of transcoding a content item version 313 at one of the edge data centers 330, and a skewness factor of the popularity distribution of the content item versions 113. In the present embodiment, for a Zipf distribution of the content item versions 313, the cost equation of FIG. 1 may be modified to $((1/(1-\alpha)-(eta^{(1-\alpha)}/(1-\alpha)-eta)) \times E_{transcode}) + (eta \times C_{storage})$, where $C_{storage}$ is the cost of storing a content item version 313 at the centralized data center 310, $E_{transcode}$ is the cost of transcoding a content item version 313 at an edge data center 330, eta is the fraction of content item versions 313 to store in centralized data center 110, and $\alpha$ is the skewness factor of the popularity distribution of the content item versions 313. As with the cost equation of FIG. 1, the cost equation $((1/(1-\alpha)-(eta^{(1-\alpha)}/(1-\alpha)-eta)) \times E_{transcode}) + (eta \times C_{storage})$ may be adapted to obtain an equation which may be evaluated to determine the fraction of content item versions 313 to store in centralized data center 310. Taking the derivative of the cost equation over eta results in the intermediate equation $(1-(eta^{-\alpha})) \times E_{transcode} + C_{storage}$. Thus, the estimated optimal value for the fraction of content item versions 313 to store in centralized data center 310 is where $(1-(eta^{-\alpha})) \times E_{transcode} + C_{storage} = 0$ (i.e., the equation represents the estimated optimal value of which fraction of content item versions 313 to store using storage resources 312 of centralized data center 310 while minimizing the cost). It is noted that the estimated optimal value represents the fraction of content item versions 313 that would be requested more than n times globally (i.e., considering all edge data centers 330). The estimated optimal value of eta is associated with the lowest point of a graph in which the fraction of content item versions 313 to store in the centralized data center 310 is plotted against the average total cost per content item version 313. The intermediate equation $[(1-(eta^{-\alpha})) \times E_{transcode} + C_{storage} = 0]$ may then be solved for eta, resulting in a final an equation of $eta = 10^{\wedge}((\log_{10}(E_{transcode}/(E_{transcode}+C_{storage})))/\alpha)$. As noted above, the cost equation that is used to determine the fraction of the content item versions 313 to store in centralized data center 310 (and, thus, the final equation for eta) may be different where the popularity distribution of the content item versions 313 follows a different distribution model (e.g., for distributions other than Zipf).

In at least some embodiments, management system 360 is configured to determine the fraction of the content item versions 313 to store in an edge data center 330 based on (1) a popularity distribution of the content item versions 313 accessed from the edge data center 330 and (2) cost model information associated with the centralized data center 310 and the edge data center 330 (namely, a cost of transferring one of the content item versions 313 from the centralized data center 310 to the edge data center (denoted as $C_{bandwidth}$) and a cost of storing one of the content item versions 313 at the edge data center 330 (denoted as $E_{storage}$)). The analysis for the present embodiment is similar to the analysis used for the centralized case of FIG. 1. In the present embodiment, storage resources 332 at the edge data center 330 are used to store content item versions 313 to the amount that the storage cost at the edge data center 330 is less than the potential bandwidth cost for transferring a content item version 313 from the centralized data center 310 to the edge data center 330 (i.e., as long as $n \times C_{bandwidth} > E_{storage}$, where the content item version 313 is available at the centralized data center 310 and where n is the total number of times that the content item version 313 is requested only at the edge data center 330 being considered). In the present embodiment, the fraction of content item versions 313 to cache in the edge data center 330 may be determined based on a cost of transferring a content item version 313 from the centralized data center 310 to the edge data center 330, a cost of storing a content item version 313 in the edge data center 330, a skewness factor of the popularity distribution of the content item versions 113 that are accessed from the edge data center 330. In the present embodiment, for a Zipf distribution of the content item versions 313, the cost equation of FIG. 1 may be modified to $((1/(1-\alpha)-(\text{eta}^{(1-\alpha)}/(1-\alpha)-\text{eta}))\times C_{bandwidth})+(\text{eta}\times E_{storage})$, where $C_{bandwidth}$ is the cost of transferring a content item version 313 from centralized data center 310 to the edge data center 330, $E_{storage}$ is the cost of storing a content item version 313 at the edge data center 330, eta is the fraction of content item versions 313 to store in edge data center 110, and $\alpha$ is the skewness factor of the popularity distribution of the content item versions 313. As with the cost equation of FIG. 1, the cost equation $((1/(1-\alpha)-(\text{eta}^{(1-\alpha)}/(1-\alpha)-\text{eta}))\times C_{bandwidth})+(\text{eta}\times E_{storage})$ may be adapted to obtain an equation which may be evaluated to determine the fraction of content item versions 313 to store in the edge data center 330. Taking the derivative of the cost equation over eta results in an equation of $(1-(\text{eta}^{-\alpha}))\times C_{bandwidth}+E_{storage}$. Thus, the estimated optimal value for the fraction of content item versions 313 to store in the edge data center 330 is where $(1-(\text{eta}^{-\alpha}))\times C_{bandwidth}+E_{storage}=0$ (i.e., the equation represents the estimated optimal value of which fraction of content item versions 313 to store using storage resources 332 of the edge data center 330 while minimizing the cost). It is noted that the estimated optimal value for the fraction of content item versions 313 represents the fraction of content item versions 313 requested at the edge data center 330 that would be requested more than n times at the edge data center 330. The estimated optimal value of eta is associated with the lowest point of a graph in which the fraction of content item versions 313 to store in the edge data center 330 is plotted against the average total cost per content item version 313. The intermediate equation $[(1-(\text{eta}^{-\alpha}))\times C_{bandwidth}+E_{storage}=0]$ may then be solved for eta, resulting in a final equation of $\text{eta}=10^{((\log_{10}(C_{bandwidth}/(C_{bandwidth}+E_{storage})))/\alpha)}$. As noted above, the cost equation that is used to determine the fraction of the content item versions 313 to store in the edge data center 330 (and, thus, the final equation for eta) may be different where the popularity distribution of the content item versions 313 follows a different distribution model (e.g., for distributions other than Zipf).

The communication system 300 may be configured to use the various resources of centralized data center 310 and edge data centers 320 to deliver content item versions 313 to edge data centers 330 in various ways. In at least some embodiments, as noted above, the management system 360 may be configured to determine, for each of one or more of the data centers of communication system 300, the fraction of the content item versions 313 to store in the data center based on cost model information associated with one or more data centers and a popularity distribution of the content item versions 313. In at least some embodiments, communication system 300 is configured such that computing resources 334 of an edge data center 330 are used only when use of the computing resources 334 of the edge data center 330 are cheaper than use of the computing resources of the centralized data center 310. In at least some embodiments, communication system 300 is configured such that the computing resources 334 of the edge data center 330 are used until the limit of the computing resources 334 at the edge data center 330 is reached, at which point the computing resources of the centralized data center 310 are used. It is noted that various combinations of such embodiments may be used. It is noted that such cost-based determinations may be made in advance (e.g., periodically, in response to a condition, or the like) or on demand (e.g., when a request for a content item is received) based on cost model information associated with the data centers of communication system 300.

The communication system 300 may be configured to use the various resources of centralized data center 310 and the edge data centers 320 to handle requests for content items received from the end user devices 350. The communication system 300 is a tiered system in which, for any given content item, a content item version 313 of the content item may be generated on any level of the system and, optionally, may be cached on any level of the system. Accordingly, when an end user device 350 sends a request for a content item, the content item version 313 for the end user device 330 may be sourced from one of the edge data centers 330 or from the centralized data center 310. A description of the various ways in which a request for a content item may be handled within communication system 300 follows.

The handling of a request for a content item begins when an end user device 350 sends a request for a content item to the edge data center 330 with which the end user device 350 is associated. The edge data center 330 receives the request for the content item and determines which content item version 313 of the content item is to be provided to the end user device 350. The identification of the content item version 313 may be specified in the request for the content item or may be determined by the edge data center 330.

The edge data center 330 determines whether the content item version 313 is cached locally in the storage resources 332 of the edge data center 330.

If the content item version 313 is not cached locally in the storage resources 332 of the edge data center 330, the edge data center 330 can either (1) determine whether a master version or a higher quality version of the content item is cached locally in the storage resources 332 of the edge data center 330 (e.g., for purposes of determining whether to perform transcoding of the master version or the higher quality version of the content item locally using the computing resources 334 of the edge data center to generate the content item version 313 of the content item or to request the content item version 313 of the requested content item from the centralized data center 310), or (2) propagate a request for the content item version 313 (or, more generally, for the content item) to the centralized data center 310.

If the edge data center 330 determines whether a master version or a higher quality version of the content item is cached locally in the storage resources 332 of the edge data center 330, the action taken by the edge data center 330 depends on the outcome of the determination. If a master version or higher quality version of the content item is not cached locally in the storage resources 332 of the edge data center 330, the edge data center propagates a request for the content item version 313 (or, more generally, for the content item) to the centralized data center 310. If a master version or higher quality version of the content item is cached locally in the storage resources 332 of the edge data center 330, the edge data center 330 (or another element on behalf of edge data center 330) determines whether to perform transcoding of the master version or the higher quality version of the content item locally using the computing resources 334 of the edge data center 330 or to request the content item version 313 of the requested content item from centralized data center 310. The determination as to whether to perform transcoding or to request the content item version 313 may be made based on cost analysis information. In at least some embodiments, a cost of transcoding the master version or the higher quality version of the content item locally at the edge data center 330 using the computing resources 334 of the edge data center 330 is determined, a cost of sourcing the content item version 313 from centralized data center 310 is determined (which at least includes the cost of accessing the content item version 313 at the centralized data center, which may include a cost of retrieving the content item version 313 or transcoding a master version or a higher quality version of the content item to generate the content item version 313) and the cost of providing the content item version 313 from the centralized data center 310 to the edge data center 330), and the determination is made based on the cost of transcoding the master version or the higher quality version of the content item locally at the edge data center 330 and the cost of sourcing the content item version 313 from the centralized data center 310. For example, where the cost of transcoding the master version or the higher quality version of the content item locally at the edge data center 330 is less than (or less than by more than a threshold) the cost of sourcing the content item version 313 from the centralized data center 310, then the content item version 313 is obtained at the edge data center 330 by transcoding the master version or the higher quality version of the content item locally at the edge data center 330. Similarly, for example, where the cost of sourcing the content item version 313 from the centralized data center 310 is less than (or less than by more than a threshold) the cost of transcoding the master version or the higher quality version of the content item locally at the edge data center 330, then the content item version 313 is sourced from the centralized data center 310 (e.g., by propagating a request for the content item version 313 or for the content item, from the edge data center 330 to the centralized data center 310).

As noted above, under various conditions a request for the content item version 313 (or, more generally, a request for the content item) is received at the centralized data center 310 from the edge data center 330.

The centralized data center 310 determines whether the content item version 313 is cached locally in the storage resources 312 of the centralized data center 310.

If the content item version 313 is cached locally in the storage resources 312 of the centralized data center 310, the centralized data center 310 retrieves the content item version 313 from the storage resources 312 and propagates the content item version 313 toward the edge data center 330 so that the edge data center 330 can further propagate the content item version 313 to the end user device 350.

If the content item version 313 is not cached locally in the storage resources 312 of the centralized data center 310 (but a master version or a higher quality version of the requested content item is available to the centralized data center 310), the centralized data center 310 determines whether to (1) transcode the master version or the higher quality version of the requested content item locally using the computing resources 312 of the centralized data center 310 to form the content item version 313 and provide the content item version 313 to the edge data center 330 or (2) provide the master version or the higher quality version of the of the requested content item to the edge data center 330 for transcoding of the master version or the higher quality version of the content item at the edge data center 330 to form the content item version 313. The determination as to whether to transcode locally at the centralized data center 310 or to provide the master version or the higher quality version of the of the requested content item to the edge data center 330 for transcoding of the master version or the higher quality version of the content item at the edge data center 330 may be made based on cost analysis information. In at least some embodiments, a cost of providing the content item version 313 from the centralized data center 310 is determined (which includes the cost of transcoding the master version or the higher quality version of the content item at the centralized data center 310 and propagating the content item version 313 from the centralized data center 310 to the edge data center 330 associated with the end user device 350 which requested the content item), a cost of providing the content item version 313 from the edge data center 330 is determined (which includes the cost of propagating the master version or the higher quality version of the content item from the centralized data center 310 to the edge data center 330 and transcoding the master version or the higher quality version of the content item at the edge data center 330 to form the content item version 313 to be provided from the edge data center 330 to the end user device 350 which requested the content item), and the determination regarding where to transcode the master version or the higher quality version of the content item is made based on the cost of providing the content item version 313 from the centralized data center 310 and the cost of providing the content item version 313 from the edge data center 330. For example, where the cost of providing the content item version 313 from the centralized data center 310 is less than (or less than by more than a threshold) the cost of providing the content item version 313 from the edge data center 330, then the master version or the higher quality version of the content item is transcoded at the centralized data center 310 to form the content item version 313 and the content item version 313 is propagated from the centralized data center 310 to the edge data center 330. Similarly, for example, where cost of providing the content item version 313 from the edge data center 330 is less than (or less than by more than a threshold) the cost of providing the content item version 313 from the centralized data center 310, then the master version or the higher quality version of the content item is propagated from the centralized data center 310 to the edge data center 330 and is transcoded at the edge data center 330 to form the content item version 313.

It will be appreciated that, in embodiments in which a master version or a higher quality version of a content item is transcoded at the centralized data center 310 to form a content item version 313, a determination may be made to cache the generated content item version 313 at the centralized data center 310, such that the content item version 313 is then available at the centralized data center 310 for serving future requests for the content item version 313 received from that edge data center 330 or from any other edge data center 330. The determination to cache the generated content item version 313 at the centralized data center 310 may be made based on a popularity of the content item version 313 (e.g., where there is expected to be sufficient demand for the content item version 313 from multiple edge data centers 330 such that storage of the content item version 313 at the centralized data center 310 is warranted). For example, for an English language version of a movie that is popular or expected to be popular over a large geographic region covered by centralized data center 310, a determination may be made to cache the English language version of the movie in the centralized data center 310.

It will be appreciated that, in embodiments in which a master version or a higher quality version of a content item is transcoded at the centralized data center 310 to form a content item version 313, a determination may be made to cache the generated content item version 313 at one or more of the edge data centers 330, such that the content item version 313 is then available at the edge data center(s) 330 for serving future requests for the content item version 313 received at the edge data center(s) 330. The determination to cache the generated content item version 313 at one or more of the edge data centers 330 may be made based on a popularity of the content item version 313 (e.g., where there is expected to be sufficient demand for the content item version 313 from end user devices 350 associated with a particular edge data center 330 such that storage of the content item version 313 at that edge data center 330 is warranted). The caching of the content item version 313 at the edge data center(s) 330 may be in place of or in addition to caching of the content item version 313 at the centralized data center 310. For example, for a Spanish language version of a movie that is popular or expected to be popular only over a geographic region covered by one of the edge data centers 330, a determination may be made to cache the Spanish language version of the movie locally in that one of the edge data centers 330.

It will be appreciated that, in embodiments in which a master version or a higher quality version of a content item is transcoded at one of the edge data centers 330 to form a content item version 313, a determination may be made to cache the generated content item version 313 at the edge data center 330, such that the content item version 313 is then available at the edge data center 330 for serving future requests for the content item version 313 received at that edge data center 330. The determination to cache the generated content item version 313 at the edge data center 330 may be made based on a popularity of the content item version 313 (e.g., where there is expected to be sufficient demand for the content item version 313 from end user devices 350 associated with that edge data center 330 such that storage of the content item version 313 at the edge data center 330 is warranted). For example, for a Spanish language version of a movie that is popular or expected to be popular only over a geographic region covered by that edge data center 330, a determination may be made to cache the Spanish language version of the movie locally in that edge data center 330 (without providing the Spanish language version of the movie to the centralized data center 310).

It will be appreciated that, in embodiments in which a master version or a higher quality version of a content item is transcoded at one of the edge data centers 330 to form a content item version 313, a determination may be made to cache the generated content item version 313 at the centralized data center 310, such that the content item version 313 is then available at the centralized data center 310 for serving future requests for the content item version 313 received at the centralized data center 310 (e.g., from that edge data center 330 or any other edge data center(s) 330). The determination to cache the generated content item version 313 at the centralized data center 310 may be made based on a popularity of the content item version 313 (e.g., where there is expected to be sufficient demand for the content item version 313 from end user devices 350 associated with multiple edge data centers 330 such that storage of the content item version 313 at the centralized data center 310 is warranted). The caching of the content item version 313 at the centralized data center 310 may be in place of or in addition to caching of the content item version 313 at the edge data center 330 which provides the content item version 313 to the centralized data center 310. For example, for an English language version of a movie that is popular or expected to be popular over a large geographic region covered by centralized data center 310, a determination may be made to cache the English language version of the movie in the centralized data center 310 rather than only caching the English language version of the movie locally at the edge data center 330 which generated the English language version of the movie.

It will be appreciated that the foregoing embodiments regarding caching of content item versions 313 after the content item versions 313 are generated may be combined in various ways. For example, a determination may be made to provide a content item version 313 generated at centralized data center 310 to multiple edge data centers 330 for caching of the content item version 313 at the multiple edge data centers 330. For example, a determination may be made to provide a content item version 313 that is generated at one edge data center 330 to the centralized data center 310 such that the centralized data center 310 may then provide the content item version 313 to one or more other edge data centers 330 (without caching the content item version 313 at the centralized data center 310).

It will be appreciated that the foregoing embodiments regarding caching of content item versions 313 after the content item versions 313 are generated include determinations that may be performed based on various types of input information (e.g., cost model information associated with the data center(s) on which the determination is based, distribution of the content item versions 313, or the like, as well as various combinations thereof).

It will be appreciated that the communication system 300 also may be configured to handle a request for a content item while also accounting for various other types of information (e.g., based on one or more pre-determined fractions of content item versions 313 to be stored in one of more of the data centers associated with delivery of the requested content item). In other words, various other embodiments described herein also may be used in combination with the embodiments described herein as related to handling of requests for content items.

It will be appreciated that, although primarily depicted and described with respect to embodiments of the cost-aware content delivery capability in which the communication system 300 includes edge data centers 330 having computing resources 334 available for use in transcoding content item versions 313, embodiments of the cost-aware content delivery capability also may be used in a distributed communication system in which one or more of the edge data centers 330 do not include computing resources adapted for use in transcoding content items versions 313. In at least some such embodiments, the communication system 300 may operate in a manner similar to a typical Content Delivery Network (CDN) in which all transcoding of content item versions 313 is performed at the centralized data center 310, the centralized data center 310 may store content item versions 313 resulting from transcoding of content item versions 313, the centralized data center 310 may propagate content item versions 313 to the edge data centers 330, and the edge data centers 330 may cache content item versions 313 received from the centralized data center 310 (e.g., operating as a transparent cache to improve delivery of such content item versions 313 to associated end user devices 350). In such embodiments, while decisions related to whether or not performing transcoding at the edge data centers 330 will not be required, various other determinations based on cost model information associated with data centers of the communication system 300 may be made (e.g., computing, for each of one or more of the data centers of the communication system 300, the fraction of content item versions 313 to store in the data center based on cost model information associated with the data center and, optionally, one or more other data centers).

It will be appreciated that, although primarily depicted and described with respect to embodiments of the cost-aware content delivery capability in which the communication system includes two tiers of data centers (illustratively, the communication system 300), embodiments of the cost-aware content delivery capability may be provided in a communication system including more than two tiers of data centers.

Figure 4:
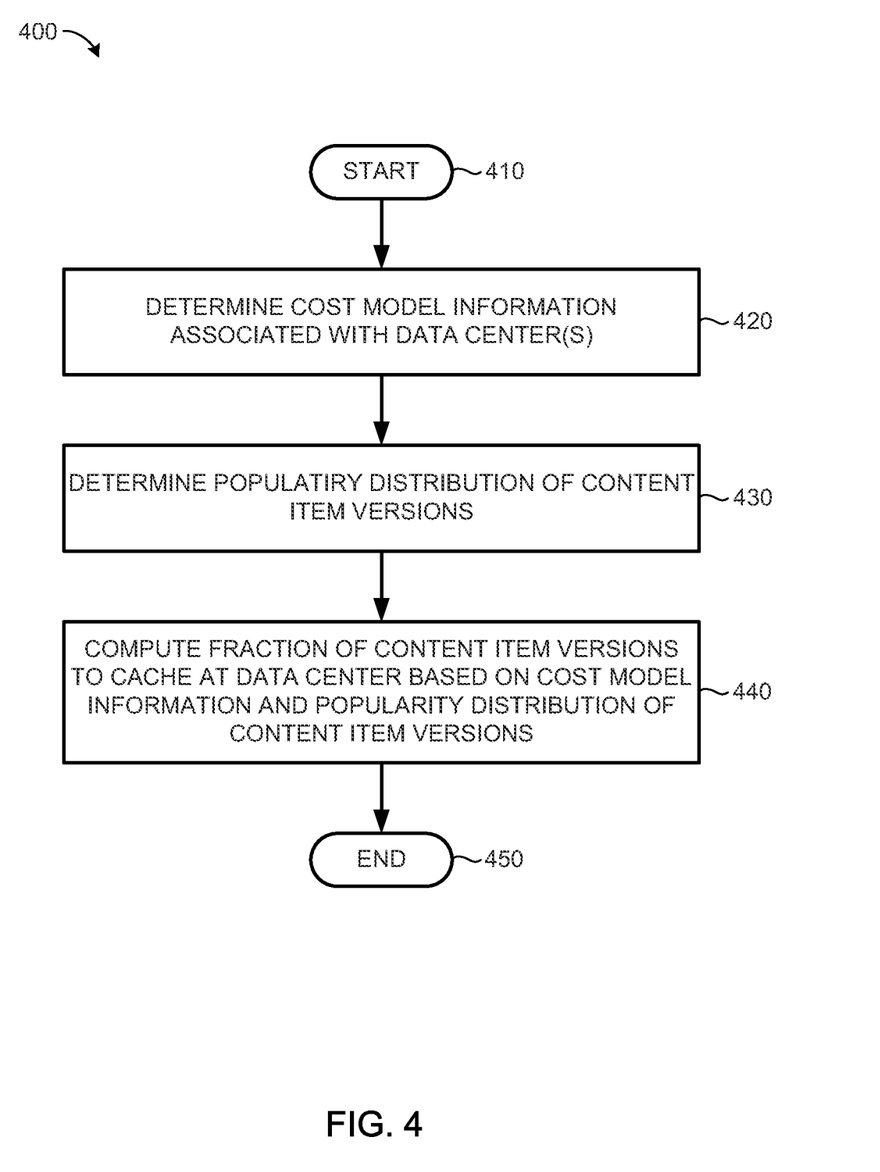
FIG. 4 depicts one embodiment of a method for computing a fraction of available content item versions to store in a data center.

FIG. 4 depicts one embodiment of a method for computing a fraction of available content item versions to store in a data center. It will be appreciated that, although primarily depicted and described as being performed serially, at least a portion of the steps of method 400 may be performed contemporaneously or in a different order than presented in FIG. 4.

At step 410, method 400 begins.

At step 420, cost model information associated one or more data centers is determined. The one or more data centers include the data center for which the fraction is determined and, optionally, another data center. The cost model information includes a cost of storing one of the content item versions at the data center for which the fraction is computed and one of a cost of transcoding one of the content item versions (at the data center for which the fraction is computed or another data center) or a cost of transferring one of the content item versions from another data center to the data center for which the fraction is computed.

At step 430, a popularity distribution of the content item versions is determined. The popularity distribution of the content item versions may be a Zipf distribution or any other suitable type of distribution.

At step 440, a fraction of the content item versions to cache in the data center is determined based on the cost model information associated with the data center(s) and the popularity distribution of the content item versions. The manner in which the fraction of the content item versions to cache in the data center is determined may be better understood by way of reference to FIG. 1-FIG. 3.

At step 450, method 400 ends.

It will be appreciated that, although primarily depicted and described with respect to determining a fraction of the content item versions to cache in a data center, the value of the fraction of the content item versions to cache in a data center may be indicative of or used to determine other related information. For example, the fraction of the content item versions to cache in a data center is indicative of the fraction of the content item versions to transcode at the data center (e.g., where 68% of the content item versions are to be cached at the data center, this indicates that 32% of the content item versions are to be transcoded). For example, the fraction of the content item versions to cache in a data center may be used to determine the amount of storage resources needed in the data center to cache content item versions (e.g., based on multiplication of the fraction of the content item versions to cache by a total storage capacity required to store all content item versions, where content item versions are assumes to be similar in size). It will be appreciated that the fraction of the content item versions to cache in a data center may be indicative of or used to determine various other types of related information.

It will be appreciated that, although primarily depicted and described herein with respect to embodiments in which the cost model information includes, for each cost type (e.g., storage cost, transcoding cost, transfer cost, or the like) a single representative cost for the cost type (e.g., a cost of storing one of the content item versions, a cost of transcoding one of the content item versions, a cost of transferring one of the content item versions, or the like), the cost model information may include, for one or more of the cost types, multiple representative costs for the respective cost type. For example, for storage cost, the cost model information may include a first storage cost for content item versions in a first subset of the content item version and a second storage cost for content item versions in a second subset of content item versions. Similarly, for example, for transcoding cost, the cost model information may include a first transcoding cost for content item versions in a first subset of the content item version, a second transcoding cost for content item versions in a second subset of content item versions, and a third transcoding cost for content item versions in a third subset of content item versions. Similarly, for example, for transfer cost, the cost model information may include a first transfer cost for content item versions in a first subset of the content item version and a second transfer cost for content item versions in a second subset of content item versions. Further, it will be appreciated that, for each cost type, the one or more representative costs may be determined from one or more costs which may be specific to one or more of a data center, a cloud service, a content item type of one or more content items, temporal information, specific ones of the content item versions, or the like, as well as various combinations thereof). Further, it will be appreciated that, although primarily depicted and described herein with respect to use of a single distribution of content item versions to determine a fraction of the content item versions to store, in at least some embodiments a fraction of content item versions to store may be determined using multiple distributions associated with multiple subsets of the content item versions (where the different subsets of content item versions also may have different costs associated therewith, e.g., one or more of different storage costs, different transcoding costs, different transfer costs, or the like, as well as various combinations thereof).

It will be appreciated that, although primarily depicted and described with respect to embodiments in which determinations based on cost model information are made by a management system (e.g., management system 140 for communication system 100 and management system 360 for communication system 300), determinations based on cost model information for a communication system may be made by any other suitable element(s) associated with the communication system. In communication system 100, for example, such determinations also may be made by one or more of an element(s) within centralized data center 110, an element(s) within communication network 120, a different type of network element, or the like, as well as various combinations thereof. Similarly, in communication system 300, for example, such determinations also may be made by one or more of an element(s) within centralized data center 310, an element(s) within communication network 320, an element(s) within an edge data center 330, an element(s) within an edge communication network 340, a different type of network element, or the like, as well as various combinations thereof.

It will be appreciated that, although primarily depicted and described herein with respect to specific types of data centers (namely, a centralized data center and edge data centers, the various embodiments depicted and described herein may be utilized for any suitable type(s) of data center(s). In a centralized architecture such as in FIG. 1 (e.g., in which a single data center serves requests for content items), for example, the centralized data center may be a data center serving a geographic region of any suitable size (e.g., a data center of a major content provider serving requests for content on a global scale, a data center implemented within a Central Office (CO) of a network service provider, or the like). In a distributed architecture such as in FIG. 3 (e.g., in which multiple tiers of data centers serve requests for content items), for example, the centralized data center and the edge data centers may be data centers of any suitable size, where it is expected that the centralized data center serves a geographic region including multiple geographic regions covered by the edge centers where the various geographic regions may be at any suitable scale. It will be appreciated that, although primarily depicted and described herein with respect to caching of content item versions at a specific type of data storage location (namely, at data centers), content item versions may be cached at any suitable data storage locations (e.g., servers not associated with data centers, server blades not associated with data centers, or the like). As such, in at least some embodiments, references herein to data centers may be read more generally as data storage locations (or data storage devices), which may have various types of costs associated therewith.

Figure 5:
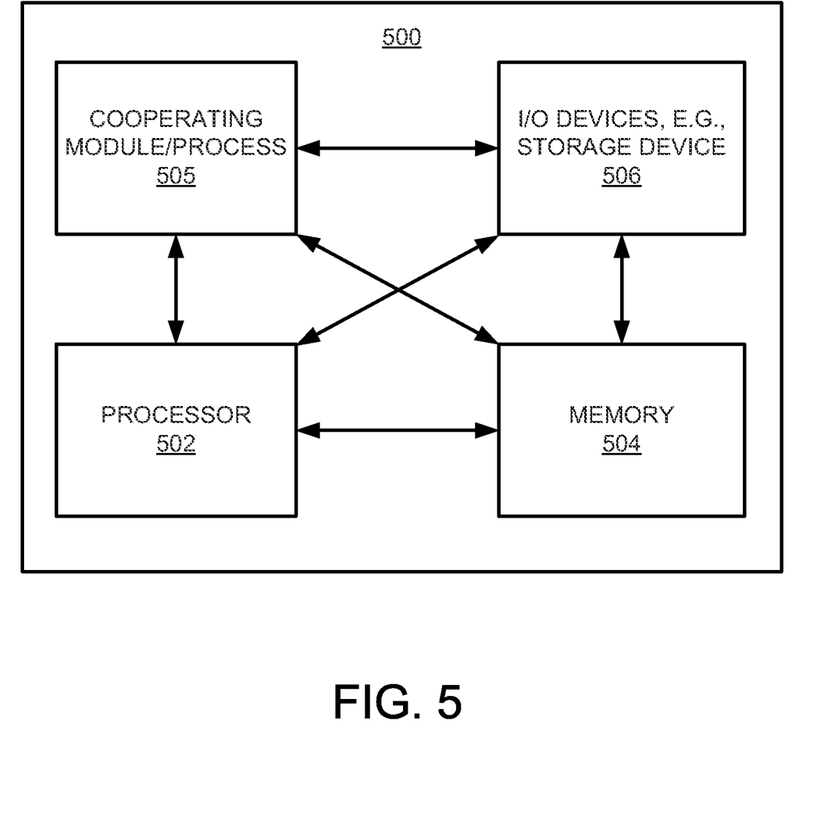
FIG. 5 depicts a high-level block diagram of a computer suitable for use in performing functions described herein.

FIG. 5 depicts a high-level block diagram of a computer suitable for use in performing functions described herein.

The computer 500 includes a processor 502 (e.g., a central processing unit (CPU) and/or other suitable processor(s)) and a memory 504 (e.g., random access memory (RAM), read only memory (ROM), and the like).

The computer 500 also may include a cooperating module/process 505. The cooperating process 505 can be loaded into memory 504 and executed by the processor 502 to implement functions as discussed herein and, thus, cooperating process 505 (including associated data structures) can be stored on a computer readable storage medium, e.g., RAM memory, magnetic or optical drive or diskette, and the like.

The computer 500 also may include one or more input/output devices 506 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 500 depicted in FIG. 5 provides a general architecture and functionality suitable for implementing functional elements described herein and/or portions of functional elements described herein. For example, the computer 500 provides a general architecture and functionality suitable for implementing one or more of an element or a portion of an element of a data center (e.g., centralized data center 110, centralized data center 310, an edge data center 330, or the like), an element or a portion of an element of a communication network (e.g., for communication network 120, communication network 320, one of the edge communication networks 340, or the like), or a management system or a portion of a management system (e.g., management system 140, management system 360, or the like).

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
determine a fraction of a plurality of content item versions to cache at a first network data storage location based on a popularity distribution of the content item versions and based on cost model information associated with the first network data storage location and a second network data storage location, wherein the cost model information comprises at least one of:
a first set of cost model information comprising a cost of storing one of the content item versions at the first network data storage location and a cost of transcoding one of the content item versions at the second network data storage location, wherein the first network data storage location is located at a first hierarchical level and the second network data storage location is located at a second hierarchical level, wherein the first hierarchical level is located farther from end users than the second hierarchical level; or
a second set of cost model information comprising a cost of storing one of the content item versions at the first network data storage location and a cost of transferring one of the content item versions from the second network data storage location to the first network data storage location, wherein the first network data storage location is located at a first hierarchical level and the second network data storage location is located at a second hierarchical level, wherein the first hierarchical level is located closer to end users than the second hierarchical level.

2. The apparatus of claim 1, wherein the popularity distribution of the content item versions is based on popularity of the content item versions at the first network data storage location.

3. The apparatus of claim 1, wherein, for the first set of cost model information, the first network data storage location comprises a centralized data center and the second network data storage location comprises an edge data center.

4. The apparatus of claim 1, wherein, for the first set of cost model information, the processor is configured to determine the fraction of content item versions to cache at the first network data storage location based on eta=10^((log 10 (Etranscode/(Etranscode+Cstorage)))/α), wherein:
   eta is the fraction of content item versions to cache at the first network data storage location;
   Cstorage is the cost of storing one of the content item versions at the first network data storage location;
   Etranscode is the cost of transcoding one of the content item versions at the second network data storage location; and
   α is a skewness factor associated with the popularity distribution of the content item versions accessed at the first network data storage location.

5. The apparatus of claim 1, wherein, for the second set of cost model information, the first network data storage location comprises an edge data center and the second network data storage location comprises a centralized data center.

6. The apparatus of claim 1, wherein, for the second set of cost model information, the processor is configured to determine the fraction of content item versions to cache at the first network data storage location based on eta=10^((log 10 (Cbandwidth/(Cbandwidth+Estorage)))/α), wherein:
   eta is the fraction of content item versions to cache at the first network data storage location;
   Estorage is the cost of storing one of the content item versions at the first network data storage location;
   Cbandwidth is the cost of transferring one of the content item versions from the second network data storage location to the first network data storage location; and
   α is a skewness factor associated with the popularity distribution of the content item versions accessed at the first network data storage location.

7. The apparatus of claim 1, wherein the popularity distribution of the content item versions has a skewness factor associated therewith, wherein the fraction of the content items to cache at the first network data storage location is determined based on the skewness factor.

8. The apparatus of claim 1, wherein, to determine the fraction of content item versions to cache at the first network data storage location, the processor is configured to:
   compute a plurality of cost values for a respective plurality of potential fraction values; and
   determine the fraction of content item versions to cache at the first network data storage location based on identification of one of the potential fraction values having a lowest cost value associated therewith.

9. The apparatus of claim 1, wherein the popularity distribution of the content item versions is a Zipfian (Zipf) distribution.

10. The apparatus of claim 1, wherein the processor is configured to:
   initiate at least one configuration action based on the fraction of content item versions to cache at the first network data storage location.

11. The apparatus of claim 1, wherein the processor is configured to execute a cache replacement scheme at the first network data storage location based on the fraction of content item versions to cache at the first network data storage location.

12. A non-transitory computer-readable storage medium storing instructions which, when executed by a computer, cause the computer to perform a method, the method comprising:

determining a fraction of a plurality of content item versions to cache at a first network data storage location based on a popularity distribution of the content item versions and based on cost model information associated with the first network data storage location and a second network data storage location, wherein the cost model information comprises at least one of:
a first set of cost model information comprising a cost of storing one of the content item versions at the first network data storage location and a cost of transcoding one of the content item versions at the second network data storage location, wherein the first network data storage location is located at a first hierarchical level and the second network data storage location is located at a second hierarchical level, wherein the first hierarchical level is located farther from end users than the second hierarchical level; or
a second set of cost model information comprising a cost of storing one of the content item versions at the first network data storage location and a cost of transferring one of the content item versions from the second network data storage location to the first network data storage location, wherein the first network data storage location is located at a first hierarchical level and the second network data storage location is located at a second hierarchical level, wherein the first hierarchical level is located closer to end users than the second hierarchical level.

13. A method, comprising:
determining, using a processor, a fraction of a plurality of content item versions to cache at a first network data storage location based on a popularity distribution of the content item versions and based on cost model information associated with the first network data storage location and a second network data storage location, wherein the cost model information comprises at least one of:
a first set of cost model information comprising a cost of storing one of the content item versions at the first network data storage location and a cost of transcoding one of the content item versions at the second network data storage location, wherein the first network data storage location is located at a first hierarchical level and the second network data storage location is located at a second hierarchical level, wherein the first hierarchical level is located farther from end users than the second hierarchical level; or
a second set of cost model information comprising a cost of storing one of the content item versions at the first network data storage location and a cost of transferring one of the content item versions from the second network data storage location to the first network data storage location, wherein the first network data storage location is located at a first hierarchical level and the second network data storage location is located at a second hierarchical level, wherein the first hierarchical level is located closer to end users than the second hierarchical level.

* * * * *